Oct. 3, 1939.  P. ROBINSON  2,174,841
ELECTROLYTIC DEVICE
Filed May 8, 1936
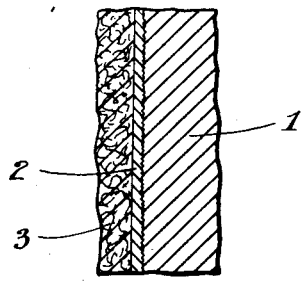
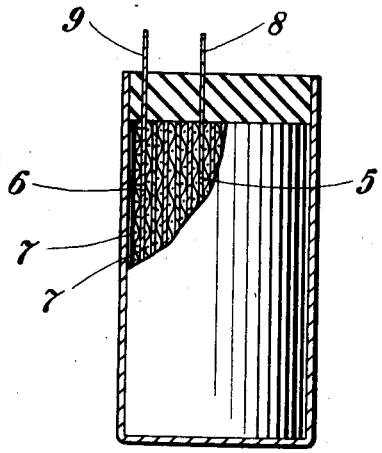
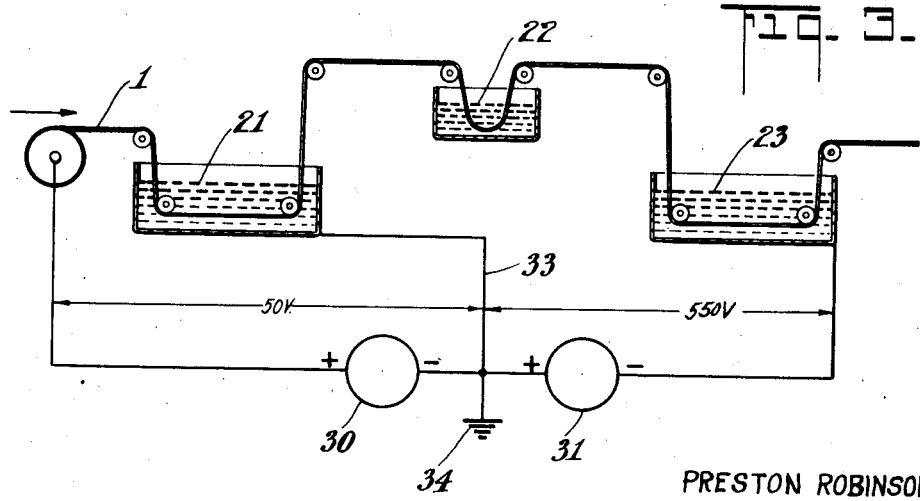
PRESTON ROBINSON
INVENTOR.
BY
Dorsey & Cole
ATTORNEYS Patented Oct. 3, 1939

2,174,841

UNITED STATES PATENT OFFICE 2,174,841

ELECTROLYTIC DEVICE

Preston Robinson, Williamstown, Mass., assignor to Sprague Specialties Co., North Adams, Mass., a corporation of Massachusetts Application May 8, 1936, Serial No. 78,700

1 Claim. (Cl. 175—315)

My invention relates to electrolytic devices and more particularly to electrolytic condensers and to the manufacture of such condensers. Electrolytic condensers in their usual form comprise two electrodes at least one of which is of so-called filming metal, for instance, of aluminum, tantalum, zirconium, etc. The condenser comprises a suitable electrolyte which may be highly fluid as is the case in the so-called wet electrolytic condensers, or may be more or less viscous as is the case in the so-called dry electrolytic condensers.

My invention applies to both wet and dry electrolytic condensers and irrespective of whether one or both of the electrodes of the condenser are filmed.

The capacity effect of electrolytic condensers is due primarily to the dielectric properties of the film provided on the filming electrode or electrodes of the condenser. This film consists as a rule of an electrolytically-formed layer of oxide of the metal of the filming electrode. In the case of aluminum it is aluminum oxide, which may be partly hydrated.

As is well known, the capacity of any type of condenser is proportionate with the effective area of the electrodes, and to increase the capacity of an electrolytic condenser for a given size it has been already proposed to increase the effective area of the electrodes by means of chemical etching, for example, as described in my copending application Ser. No. 716,714, filed March 21, 1934.

As has been stated in said application, etched electrodes, because of the proximity of adjacent portions of the filmed electrodes present difficulties in film formation and also give rise to corrosion in operation.

To overcome such objections, I have suggested in said prior application, the addition of certain carbohydrates and also certain monobasic acids of the long chain type, such as palmitic, stearic, oleic acids, which when present in the "forming" electrolyte improve the film formation of the filming electrode and when present in the electrolyte of the condenser, i. e., the "final" electrolyte, protect the filmed electrode from corrosion.

I have found that similar improvement in film formation, and especially a protection against corrosion of etched filming electrodes, can be obtained in a different manner, which proves to be in many instances simpler, less expensive, as well as more effective, than the protection obtained by the method of said prior application.

As aluminum is generally used as the material of the filming electrodes, and as my invention is particularly useful in the case of aluminum electrodes, I shall assume hereinafter the filming electrode to be of aluminum, although it should be well understood that my invention is also applicable to electrodes of any other filming metal.

Also, while my invention is of greatest advantage for condensers with etched electrodes, it is also useful for condensers having non-etched electrodes.

According to my present invention the protection of etched filmed electrodes against corrosion is obtained by a process which takes place prior to the formation of the film and which, besides improving the film formation, protects the so-formed film against corrosion, and this, as a rule, without the addition of any special protective substance to the final electrolyte.

The process according to the present invention consists of a treatment of the etched aluminum surface, which provides on this surface a protective layer. This layer is preferably provided by means of electrolytic formation of a protective film on the etched surface, although instead thereof a chemical treatment may be used with satisfactory results.

When applying the protective layer by means of electrolytic formation, I use as forming electrolyte an acid solution either of a monobasic acid or of a polybasic acid at a pH at which the anions of the solution consist almost entirely of univalent anions. Suitable monobasic acids are formic acid, acetic acid and the like, and suitable polybasic acids are oxalic, titano-oxalic, chromic, phosphoric, sulphuric acid and the like.

Furthermore, the univalent anions of the forming solution should be of such character as to form stable compounds with either aluminum or aluminum-oxide.

With a forming electrolyte of the above type, and with negative ions present therein substantially only as univalent ions, I can provide on the surface of the electrode a coating consisting of a coarse and porous oxide film. This film, while having no, or at least no appreciable, dielectric effect, admirably serves the purpose set forth above, namely of preventing corrosion of closely contiguous surfaces.

While the exact pH of the electrolyte is no critical and may vary depending on the electrolyte used, it is quite essential that the electrolyte contain substantially only univalent anions; although the exact reason for this is not fully known to applicant, it seems that the univalent anions are the agents which are effective in producing a thick porous protective film, whereas the presence of a substantial amount of bivalent anions tends to form a thin, non-porous dielectric film.

While to obtain the above condition as a rule a high acidity is required, the pH values at which the best results are obtained depend on the electrolyte. For example, oxalic acid at a concentration at which it has a pH of .9, forms a satisfactory protective layer. If the pH of the oxalic solution is raised to as high as 4, there is an increasing tendency to form a thin dielectric film rather than a thick protective film. On the other hand, if a solution having a pH of 2.5 corresponding to sodium mono-hydrogen oxalate is used, even more satisfactory results are obtained.

The presence of sodium ions can be disregarded and the sodium hydrogen oxalate contains 92% of the oxalate as univalent ions, 3% as bivalent ions, and 3% of the oxalate as undissociated acid; whereas the oxalic acid solution in the above concentration contains circa 50% of univalent ions and 50% of undissociated acid.

In conducting experiments with oxalate solutions at pH values ranging from 0.9 to 3.1, while all the films so formed show the desired improvement, I have determined that the best results are obtained with a pH of 2.5. Condensers the films of which are subjected to such preliminary treatment in oxalate solutions and subsequently formed in a solution of borax and boric acid, when using an electrolyte at which the breakdown would normally occur at 460 volts, show the following results: With an oxalate solution having a pH of 0.9, the breakdown voltage is 480 volts; with a pH of 2.5, the breakdown voltage is 525 volts; with a pH of 3.1, the breakdown voltage is 515 volts. In these formations the current, temperature and time of formation were kept the same. Thus the greatest increase in breakdown voltage is obtained with a pH of 2.5; furthermore, the equivalent series resistance of condensers made with these films is also less for the films formed in a solution of pH 2.5 than it is for the films formed in a solution of pH 0.9. (The values for the pH 2.5 and pH 3.1 solutions are substantially the same).

The reason for the above results is not immediately apparent, but is believed to come about in the following manner: The film formed in the oxalate solution is a compound of oxalate and aluminum. In solutions of very low pH, this compound hydrolyzes and aluminum hydroxide is formed. In solutions of very high pH there is sufficient quantity of bivalent ions present so that instead of this compound alone being formed, a thin oxide film is also formed. At intermediate pH values both the effect of forming a thin oxide film, and of hydrolyzing the compound film into hydroxide, are largely absent, so that the formation of the compound film takes place with a minimum of side reactions. In the case of oxalate solution, these optimum conditions occur at the pH corresponding to sodium hydrogen oxalate.

With the temperature and solution fixed, an increase in the length of time of formation of the preliminary film results in some improvement in behavior, the initial breakdown voltage being higher, and the equivalent series resistance lower. However, in the case of etched anodes, this length of formation, and the thickness per film is limited by the capacity which is desired.

In keeping the pH, current, and time fixed, by varying the temperature, we find that the voltage necessary for the preliminary formation decreases as the temperature increases. Here we find that the optimum conditions take place at moderate temperatures. At very low temperatures high voltages are required, and a dense film is obtained which tends to lower the capacity, without causing an important rise in the breakdown voltage. At high temperatures, even at high pH values the tendency of the compound film to hydrolyze as fast as it is formed is pronounced, and the results which are obtained substantially correspond to those obtained in a solution of low pH at normal temperatures.

In case the corrosion-preventing layer is formed by chemical treatment I use for such treatments the same type of acid solutions as used in connection with the above electrolytic formation, and at the same pH range; however, in this case I add to the solution an oxidizing agent, such as sodium perborate, potassium permanganate, potassium bichromate, hydrogen peroxide, and the like.

The coarse porous layers obtained by such chemical oxidation have substantially the same character as the layers obtained by the above electrolytic formation, although they are usually somewhat less porous and thinner than the latter; however as these differences practically balance each other, the protective properties of the electrolytically- and chemically-formed layers are substantially the same.

I shall illustrate my invention on specific examples and in connection with the accompanying drawing forming part of this specification, and in which:

Fig. 1 is a diagrammatic sectional view on a greatly enlarged scale of an electrode element in accordance with my invention;

Fig. 2 is a schematic partly sectionized side view of a condenser embodying my invention:

Fig. 3 is a schematic illustration of a suitable installation adapted for the process of my invention.

I shall describe my invention in connection with so-called D. C. dry electrolytic condensers as are used, for example, in the filter circuits of radio receiving sets, and in which only one of the electrodes, namely the anode, is provided with a dielectric film, this electrode consisting of aluminum foil the surface of which has been increased by chemical etching.

However, as has been stated, my invention is not limited to such devices and is applicable irrespective of whether the condensers are dry condensers or wet condensers, of aluminum or other film-forming electrodes, and whether the electrodes are etched or not etched.

For the electrode, I preferably use an endless aluminum foil having a thickness of about .004" and which may be commercial aluminum of a purity of about 99.8%.

The electrode foil is first subjected to chemical etching, which may take place in accordance with any suitable known method, for example in accordance with the method described in my above referred to copending patent application Ser. No. 716,714.

The application on the etched foil of the protective coating can take place, as has been stated, electrolytically or chemically.

If the protective layer is applied by electrolytic formation, I prefer to pass the etched foil in a continuous process through an electrolyte consisting of an acid of the type previously stated, and at a pH at which substantially all of its anions are univalent. A very suitable acid for this purpose is oxalic acid, of which I prefer to use aqueous solutions containing from 1% to 10%, and preferably 3% to 5% oxalic acid by weight. Such oxalic acid solutions give a pH range at which substantially only univalent ions are present, for example, with a 3.5% solution of oxalic acid the pH is approximately 1.0.

While the electrode foil passes through this electrolyte, I apply thereto a forming voltage which is preferably of the order of 50 to 60 volts, the full forming voltage being immediately applied to the foil as it immerges in the electrolyte. The foil is passed through the electrolyte preferably in a continuous process, the rate of advance depending upon various factors, especially if, as will be later described, I combine several successive operations in a continuous treatment of the foil. As a rule a speed of about 3 to 10 feet a minute is used.

Excellent results in producing the protective coating are obtained with a consumption of about 100 amperes-minutes per square inch of foil area. The temperature of the electrolyte is preferably kept slightly above room temperature, and is usually about 30 to 50° C.

If to the 3.5% solution of oxalic acid, sodium hydroxide is added until the pH is 2.5, then the solution corresponds to sodium hydrogen oxalate. In conducting the formation to obtain the same current at the specified temperature, it is necessary to raise the voltage somewhat. Thus at a voltage of 75 to 90 volts, the speeds and currents correspond to the above example, while the film obtained shows some improvement in the breakdown voltage, and a lowering of the series resistance.

The porosity and thickness of the layer can be influenced and adjusted with considerable accuracy to desired values, by changing the factors influencing the film formation, for example, with a given electrolyte, by the proper selection of the temperature of the electrolyte and of the current density used in formation. By proper selection of these factors a film can be obtained the porosity and thickness of which is best suited for the particular type of condenser for which it is used.

As a rule the thickness of the protective coating should be between 5 to 15 microns, whereas the best suited porosity is usually experimentally determined. In general, too great porosity of the protective layer is objectionable on account of the inadequate protection of the underlying electrode surface, whereas too low a porosity of the layer as a rule deleteriously affects the subsequent formation of the dielectric film, and adherence thereof to the base metal.

With regard to the thickness of the layer, less than 5 microns is usually insufficient to give satisfactory protection, whereas too thick layers are objectionable for the following reason: As the etched surface of the electrode foil is irregular, the protective film as it forms into the surface of the aluminum, tends to smooth out the irregular surfaces of the etched aluminum and consequently decreases its effective surface area. The thicker the protective film the greater such smoothing effect, so that as the thickness of the film approaches in order of magnitude the overall dimensions of the etched cavities of the electrode the entire benefit of the etching may be lost, this being the case when the thickness of the protective layer is of the order of 50 microns.

Even with thicknesses of 5 to 15 microns, the loss of effective surface area of the etched electrode is about 15 to 30%, but this loss is well compensated by the protective action obtained by the protective layer.

The formation of the final or dielectric film may take place by any well-known method, for example, the processes described in my applications Ser. No. 548,270, filed July 1, 1931, now United States Patent No. 2,057,314 issued October 13, 1936, and Ser. No. 26,291, filed June 2, 1935, and depends primarily on the final use of the condenser.

For example, in connection with the type of D. C. dry condensers under consideration, designed for instance, for peak voltages of about 600 volts, I may use as a forming electrolyte a solution consisting of 100 grams of boric acid, ½ gram of borax, and one liter of water. The formation again takes place preferably by the quick formation process as described in my applications Ser. No. 548,270 and Ser. No. 26,291, whereby I immediately apply to the foil the maximum forming voltage of about 600 volts, or even a voltage slightly in excess thereof, and pass the foil through the electrolyte in a continuous process at a suitable rate of advance.

In certain cases I prefer to insert between the protective film formation and the formation of the dielectric film an intermediate treatment, which is primarily for the purpose of removing all traces of the acid solution used in the formation of the protective layer and/or for the conversion of the univalent ions to bivalent ions. This treatment may take place by using, for example, distilled water, a dilute ammonia solution or other suitable reagents.

In practice I prefer to arrange the treatment and forming processes so as to constitute a continuous operation, as is shown in Fig. 3.

In Fig. 3 the direction of the advance of the foil is indicated by the direction of the arrow, the foil 1 passing successively through three baths 21, 22, and 23. The first bath 21 consists of the electrolyte for the formation of the coarse protective coating; the bath 22 contains the solution for the intermediate treatment, namely, to remove from the foil any trace of the first electrolyte, and/or to change in the electrolyte carried by the foil the univalent negative ions into bivalent ions, whereas the bath 23 constitutes the forming electrolyte for the dielectric film.

Preferably two separate sources of energy are provided for the formation of the protective coating and of the dielectric film respectively, these being for example, two D. C. generators 30 and 31, the generator 30 being a low-voltage generator supplying, for example, 50 volts and large currents, whereas the generator 31 supplies a high voltage, for example 550 volts and smaller currents. The negative pole of generator 30 is connected to the positive pole of the generator 31, and this junction point is connected at 33 to the metallic container of the electrolyte 21, which is grounded, as shown at 34. The positive pole of generator 30 is connected directly to the aluminum foil ahead of its points of immersion into the electrolyte 21, whereas the negative pole of generator 31 is connected to the metallic container of the electrolyte 23.

With such arrangement the second generator, instead of having to be designed for the full forming voltage required for the formation in electrolyte 23, can be designed for a smaller voltage, as the forming voltage applied to the foil is the sum of the voltages of the generators 30 and 31.

It will be obvious that as the electrode foil 1 passes in succession through the electrolyte 21, solution 22, and electrolyte 23 with the application of the voltages as above stated, it will be covered first with a protective coarse coating, then rinsed and treated, and thereafter provided with the dielectric film underneath the protective coating.

Instead of using an arrangement as just described I may use a single forming bath and form the protective layer and the dielectric film in the same baths, but modify the electrolyte used in between the two formations.

For example, I may use for the formation of the protective layer a solution of phosphoric acid having a pH of about 3, at which pH value about 95% of the anions of the solution are univalent ions and may form at a voltage of about 40 volts.

After the protective film has been formed in this solution the phosphoric acid is modified so as to make its negative ions bivalent, for example by adding thereto a solution of sodium-hydroxide in a sufficient amount to bring the pH to about 7 to 8. In the second or dielectric film formation I use the required higher forming voltage, for example 250 volts, and preferably also rapid formation.

Instead of using an electrolytic formation for the protective layer, as has been stated before, a chemico-oxidation process may be used. In this case, I treat the electrode in a bath comprising a suitable solution, for example, sulphuric acid having added to it as oxidizing agent, potassium permanganate. The protective layer formed assumes a configuration which closely corresponds to the configuration of the etched foil surface.

The duration of this chemico-oxidation and the temperature of the bath depends on the concentration of the solution used and on other factors. As a rule, the etched foil should remain in the solution until visible coating colors are obtained in a substantially uniform manner over its entire surface.

The subsequent dielectric film formation can take place in any suitable manner.

A portion of the electrode treated in accordance with the invention is shown in Fig. 1, 1 being the etched aluminum foil, 2 the dielectric film, and 3 the protecting layer.

A condenser using such an electrode is shown in Fig. 2. The etched foil 5 provided with the protective coating and dielectric film, together with a non-filmed foil 6, also usually of aluminum, and with suitable interposed spacers, for example of paper, gauze or the like, are wound into a roll or assembled into a stack. The electrolyte may be applied to the spacer before the condenser is assembled, or the condenser may be impregnated with the electrolyte after its assembly in known manner. Various well-known final electrolytes may be used for the condenser, for example, an electrolyte comprising glycol and boric acid and having a pH of 4, or a glycerol-ammonium-borate and boric acid electrolyte, or a gluconic acid electrolyte, etc.

Electrodes for wet electrolytic condensers may be made in a similar manner and the formed electrodes assembled in a suitable assembly with an electrolyte which is suited for wet electrolytic condensers; for example, an aqueous solution of ammonium-borate and boric acid having a pH of about 5.

The advantage of my novel process is of giving condensers which have quite outstanding characteristics, and are superior to condensers produced by prior art methods, for example, they permit the use of much thinner spacers in dry condensers, e. g., it is possible to make such condensers which are adapted to operate at a voltage of about 475 volts, with a total paper spacer thickness of less than .007 inch, and even as low as .005 inch for an anode capacity of 100 microfarads for 2.5 square inches, whereas under similar conditions the minimum requirement for prior art condensers has been a total spacer thickness of .016 inch. As a result, when using D. C. dry condensers manufactured in accordance with the above invention, and using paper spacers preswelled and impregnated in accordance with my patent application Ser. No. 740,487, filed August 18, 1934, now United States Patent No. 2,081,068, issued May 18, 1937, it is possible to make a unit of 10 microfarads adapted to be operated at 475 volts and having a volume of only one cubic inch, which gives extremely small condensers compared with what has been obtained in the past.

While I have described my invention in connection with specific examples and in specific applications, I do not wish to be limited thereto, but desire the appended claims to be construed as broadly as permissible in view of the prior art.

What I claim is:

In the manufacture of electrolytic condensers, the process which comprises, subjecting an etched foil of a film-forming metal to a surface treatment with a solution having a small amount of undissociated acid and the anions of which are substantially entirely univalent ions, and which comprises as main constituent an acid, forming in said solution a porous film having a thickness of the order of 5 to 15 microns on said metal and without intermediate hydrolyzation of the so-treated surface subjecting said foil to a surface treatment in a second solution to change in the first solution remaining on said foil the univalent ions to bivalent ions, and thereafter subjecting said foil to a dielectric film formation.

PRESTON ROBINSON.